(12) United States Patent
Osei-Agyeman et al.

(10) Patent No.: US 8,573,771 B2
(45) Date of Patent: Nov. 5, 2013

(54) EAR-FREE EYEWEAR FRAMES

(76) Inventors: Linda Osei-Agyeman, Fayetteville, GA (US); Deborah H Wells, Roswell, GA (US)

( * ) Notice: Subject to any disclaimer, the term of this patent is extended or adjusted under 35 U.S.C. 154(b) by 0 days.

(21) Appl. No.: 13/441,506

(22) Filed: Apr. 6, 2012

(65) Prior Publication Data

US 2013/0265538 A1  Oct. 10, 2013

(51) Int. Cl.
*G02C 5/14*  (2006.01)
(52) U.S. Cl.
CPC ........................... *G02C 5/143* (2013.01)
USPC ............................. 351/111; 351/41
(58) Field of Classification Search
CPC ..................................... G02C 5/143
USPC ........................... 351/41, 111–123
See application file for complete search history.

(56) References Cited

U.S. PATENT DOCUMENTS

| | | | |
|---|---|---|---|
| 715,533 A * | 12/1902 | Anderson | 351/90 |
| 2,280,666 A * | 4/1942 | Schofield | 351/123 |
| 3,796,482 A | 3/1974 | Blumenthal | |
| 5,258,784 A | 11/1993 | Baines | |
| 6,193,368 B1 | 2/2001 | George | |
| 6,776,483 B1 | 8/2004 | Wu | |
| 7,237,892 B2 | 7/2007 | Curci et al. | |
| 8,029,133 B2 | 10/2011 | Chen | |
| 2003/0174277 A1 | 9/2003 | Conner | |
| 2006/0055875 A1 | 3/2006 | Yang | |
| 2007/0279583 A1 | 12/2007 | Bovee | |
| 2008/0225225 A1 | 9/2008 | Umeda | |
| 2010/0259718 A1 | 10/2010 | Hardy | |

FOREIGN PATENT DOCUMENTS

KR    100864134 B1    4/2008

\* cited by examiner

*Primary Examiner* — Huy K Mai
(74) *Attorney, Agent, or Firm* — Deborah H. Wells; Linda Osei-Agyeman

(57) ABSTRACT

The inventive concept herein, entitled "Ear Free Eyewear Frames" is designed to allow users of any Over the Ear (OTE) and Behind The Ear (BTE) devices to wear these devices without interference from the temple or earpiece of the standard eyeglass frame. This includes devices such as hearing aids, earphones and hands-free phone devices similar to the commercial Blue Tooth. The inventive concept essentially comprises, on one side of a wearer's face, a short-lengthed temple or arm piece, having no bend, and no earpiece. For persons having discomfort issues or medical problems concerning both ears, the inventive concept also is fabricated with a matching pair of short temples and temple tips.

4 Claims, 6 Drawing Sheets

EAR-FREE EYEWEAR FRAMES

CROSS-REFERENCES TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION (1) Field of the Invention

The invention entitled "Ear Free Eyewear Frames" was invented by an individual having some family members who wear cochlear implants and some with both single and double hearing aids. The family member who discovered the comfort of wearing eyeglasses without the customary temple and earpiece had accidentally dropped and broken one side of the frame of her glasses. She did not have a second pair and had to wear her glasses with the broken temple, just short of her outer ear, on the same side her cochlear implant was inserted. She immediately realized that the glasses were extremely comfortable and did not interfere with her hearing device. She continued to wear the glasses and decided that this was a very fortunate development in her life.

For many years, dimensions and proportionate relationships of the components of eyeglass frames was an art involving a combination of varying methods and numerical formulas. There was not a universal standard by which all frames were measured. The Optical Manufacturers Association (OMA), in 1962, determined that all eyewear frames made by their members would be measured and marked using one system, called the Boxing System of frame measurement. It is now the official standard for the eyewear industry.

However, the OMA standardization efforts dealt mainly with construction of lenses and the determination of distance between two eyeglass lenses, determined by the interpupillary distance of a patient. Eyeglass wearers can usually have prescription glasses measured to fit their specific facial contours, however, there is not a product aimed at those persons who have difficulty tolerating or accommodating the standard temple, or arm piece, including its bend and the associated earpiece. The inventive concept herein provides a solution to eyeglass wearers who need such relief, in addition to those who merely want the convenience of a special type eyeglass frame that won't interfere with Over-The-Ear (OTE) or Behind-The-Ear (BTE) devices.

(2) Description of the Related Art, Including Information Disclosed Under 37 CFR 1.97 and 1.98

The inventor in U.S. Pat. No. 8,029,133 (Chen) devised a pair of eyeglasses including a frame having two endpieces and two temples each pivotally mounted on the respective endpiece of the frame. Thus, a user only needs to rotate each of the temples relative to the respective endpiece to attach each of the temples to the respective endpiece so that the eye-glasses are assembled easily and quickly.

US patent application #2010/0259718 (Oct. 14, 2010; (Hardy) discloses a frame for eyeglasses, an associated temple, and a method of making the same are provided. The temple includes a receiver, a pliable support member, and a flexible ear piece. The ear piece extends around the support member and the second end of the receiver. The flexible ear piece and the pliable support member form an integrated ear piece that is shapeable by a wearer.

In US 2008/0225225 (Umeda, H.) each of the temples of an eyeglass form includes a first and second temple portions rotatably coupled together via a second joint, an axis of the second joint coupling the first and second temple portions together is disposed on either an inner side or an outer side of a center of a width of the temple is formed between the opposing surfaces or in surfaces on an outer side of the second joint, enabling the temples to be further pushed open outward by only a small angle in a state opened due to the first joint.

KR 100864134 (Hwa, P.) discloses a spectacle frame capable of changing temples which is devised to improve coupling strength of the temples by forming insertion protrusions on the temples and insertion grooves on temple rotating units. A spectacle frame includes insertion protrusions, main bodies, and stopping members. The insertion protrusion is formed at an end of each of temples with the same thickness as the temples and has a stopping groove. The main body has an insertion groove into which the insertion protrusion is inserted and is coupled with an end of each of temple rotating units.

US 2007/0279583 (Bovee, J.) An eyeglass structure includes a lens frame and a pair of articulated temples mounted by a respective first hinge pin to one and the other side of the frame, the temples rotating relative to the pin and about a first axis towards and away from one another. The articulated temples each include forward and rearward sections having mating portions that are frictionally engaged and a second hinge pin that connects the section together for rotation about a second axis, transverse to the first axis thereof.

U.S. Pat. No. 7,237,892 B2 (Curci et al.) The invention is a novel hinge assembly for eyeglasses wherein a first structural member for the hinge structure is formed in a first molding step and a second structural member of the hinge structure is formed directly over a portion of the first structural member in a second molding step. The over-molded components form a ball and socket type joint allowing a large degree of lateral rotation in one direction and a limited amount of freedom in a second direction. This hinge allows the temple portion of the eyeglasses to be folded against the brow bar and the inclination angle between the temples and the brow bar to be adjusted.

US 2006/0055875 (Yang, S.) Disclosed is a pair of eyeglasses which includes a lens unit and a pair of temples. The lens unit includes two opposite temple-connecting parts, each of which has a first engaging member that is formed with first teeth. Each of the temples is respectively pivoted to the temple-connecting parts so as to be rotatable relative to the lens unit about an axis. Each of the temples has a second engaging member that is formed with second teeth which are centered about the axis and which mesh with the first teeth. One of the first and second engaging members is resilient so as to slightly deform in radial directions relative to the axis.

U.S. Pat. No. 6,776,483 (Aug. 17, 2004; Wu, J.). features a pair of spectacles including a rim, two angle adjusting devices each mounted on the rim, and two temples each mounted on a respective angle adjusting device. Each of the angle adjusting devices includes a connecting member formed with a locking pawl, and a pivot member pivotally mounted on the connecting member and formed with locking grooves. Thus, the locking pawl of the connecting member is detachably locked in either one of the locking grooves of the pivot member, so that the included angle between the connecting member and the pivot member is changed arbitrarily so as to adjust the angle of the rim relative to the temples.

US 2003/0174277 (Conner, W.) Herein disclosed is a multiple part eyeglass frame for rimless eyeglasses manufactured from plastic having properties which withstand the constant flexing associated with eyeglasses. The present invention is especially useful in situations where a conventional temple hinge is not used. Temples of the present invention are formed of two individual pieces allowing a temple length to be adjusted. The temple pieces are fabricated, such that when joined, the resulting temple follows the normal curvature of a wearer's head.

U.S. Pat. No. 6,193,368 (George, B.) The invention shows a spectacle temple which has an arm coupled at one end to the lens portion of said spectacles and terminating in a hook at the opposite end, where the arm has a plurality of adjustable sections, each section having at least one ball in socket connection that is rotatable in any direction. The adjustable sections correspond to the temple area of a wearer's head, the top of the ear, and the curved portion of the ear.

U.S. Pat. No. 5,258,784 (Baines, I.) Disclosed is a spectacle frame including a nose bar, a pair of eyewires each having one side connected to the ends of the nose bar and end pieces on their other side and a pair of temples pivotally connected to the end pieces of the eyewires. The nose bar and/or the pair of temples include at least three links having inter-engaged end portions. These links are fixedly connected, although some limited articulation may be provided.

U.S. Pat. No. 3,796,482 (Blumenthal, O.) This invention provides an improvement in a spectacle frame of relatively rigid material comprising a front part and side pieces hinged thereto and having at least one flexible portion formed by a chain having elements mutually articulated and held together by a flexible inner core passing through said chain.

BRIEF SUMMARY OF THE INVENTION

The inventive concept herein, entitled "Ear Free Eyewear Frames" is designed to allow users of any Over the Ear (OTE) and Behind The Ear (BTE) devices to wear these devices without interference from the temple or earpiece of the standard eyeglass frame. This includes devices such as hearing aids, earphones and hands-free phone devices similar to the commercial Blue Tooth. The inventive concept essentially comprises at least one short-lengthed temple or arm piece, no bend, and no earpiece on one side, or if necessary, on both sides of a wearer's face.

DETAILED DESCRIPTION OF THE INVENTION

The eyewear industry utilizes certain ranges in the fabrication of eyeglass frames. The eye size (contains the lens), being the horizontal width in millimeters (mm) of the frame lens, generally 40 mm to 62 mm, or approximately 0.75 inches to 1.5 inches. The bridge (distance between the two lenses) is normally 14 mm to 24 mm, or 0.5 inch to 1.0 inch. Lastly, the temple, or arm piece, length (from the temple tip to the hinge), may be between 120 mm to 150 mm, or 4.75 inches to 6.0 inches.

Figure 1:
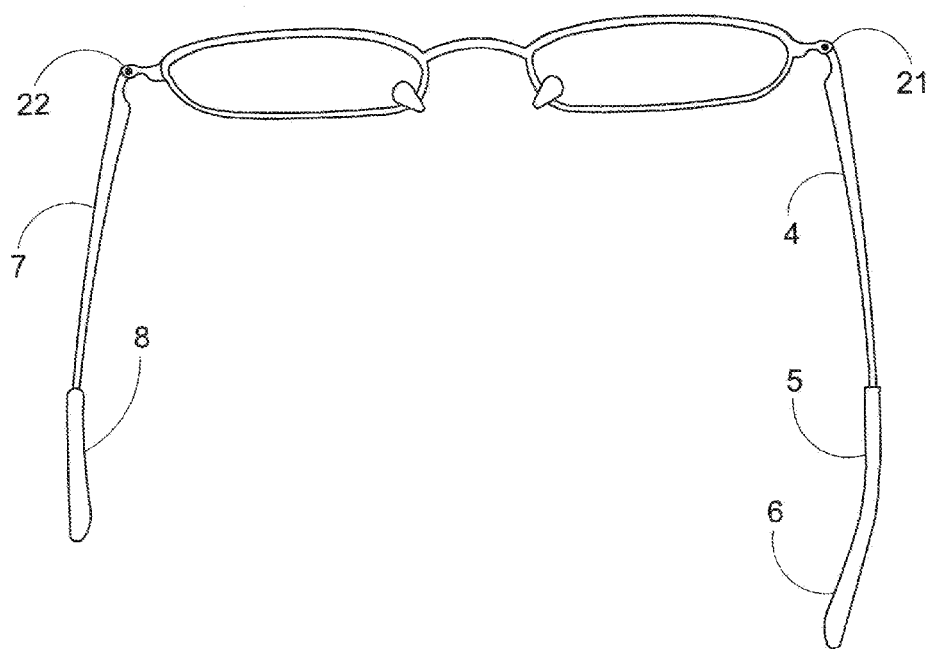
FIG. 1 represents a standard temple length of 5-to-6 inches (12.7-15-2 cm), on the right and the Ear Free Eyewear temple length, 4-to-5 inches (10.16-12.7 cm) on the left.

It will be noted that all references to "left" side and "right" side in the disclosures of this inventive concept will be in relation to the left side and right side of an eyeglass wearer's face. Beginning with FIG. 1, there is shown a standard-length right temple 4 of 5-to-6 inches (12.7-15-2 cm), on the right side of the illustrated eyeglass pair. Also, on the right side is the standard bend 5, and a standard right earpiece 6. There is further observed, in FIG. 1, on the left side of the eyeglass pair, a shortened left temple 7 and a horizontally-oriented left temple tip 8. This arrangement of eyeglass pairing permits the wearer to enjoy the comfort of non-interference with an OTE, BTE, or hearing aid which may be in use on the left side of the wearer's face. In the event that the left temple 7 should not be sufficiently secure for the wearer, the left hinge 22 may be tightened to provide a more stable fit.

Figure 2:
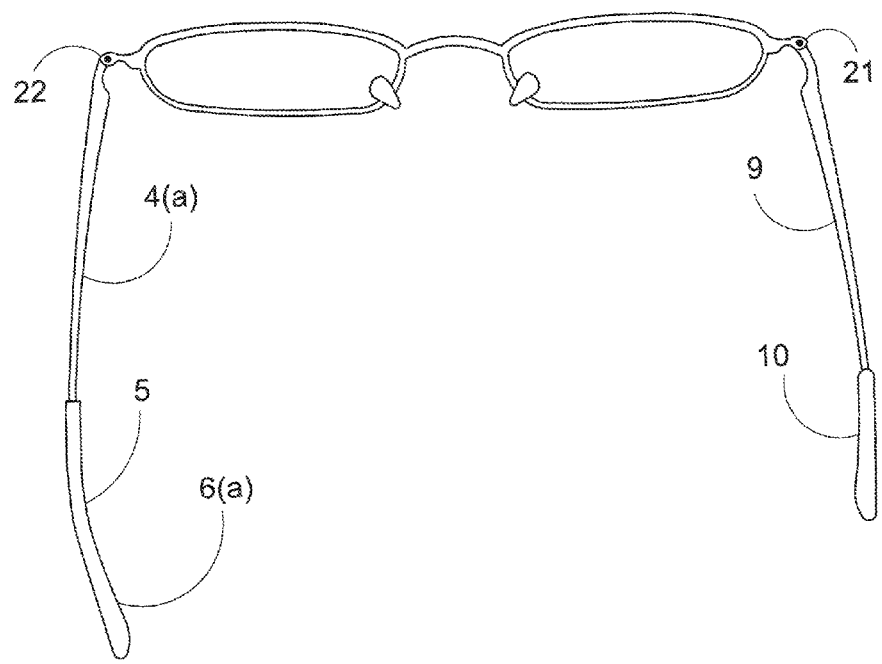
FIG. 2 shows a standard temple length, 5-to-6 inches (12.7-15-2 cm) on the left and the Ear Free Eyewear temple length, 4-5 inches (10.6-12.7 cm) on the right to accommodate a devices worn on or in the right ear.

In viewing FIG. 2, there is shown a standard-length left temple 4(a) of 5-to-6 inches (12.7-15-2 cm) in length, on the left side of the illustrated eyeglass pair. Also, on the left side is the standard bend 5, and a standard left earpiece 6(a). There is further observed, in FIG. 2, on the right side of the eyeglass pair, a shortened right temple 9 and a horizontally-oriented right temple tip 10. This arrangement of eyeglass framing permits the wearer to enjoy the comfort and accommodative qualities if the wearer utilizes an OTE or BTE on the right side of the face. In the event that the right temple 9 should not be sufficiently secure for the wearer, the right hinge 22 may be tightened to provide a more stable fit.

Figure 3:
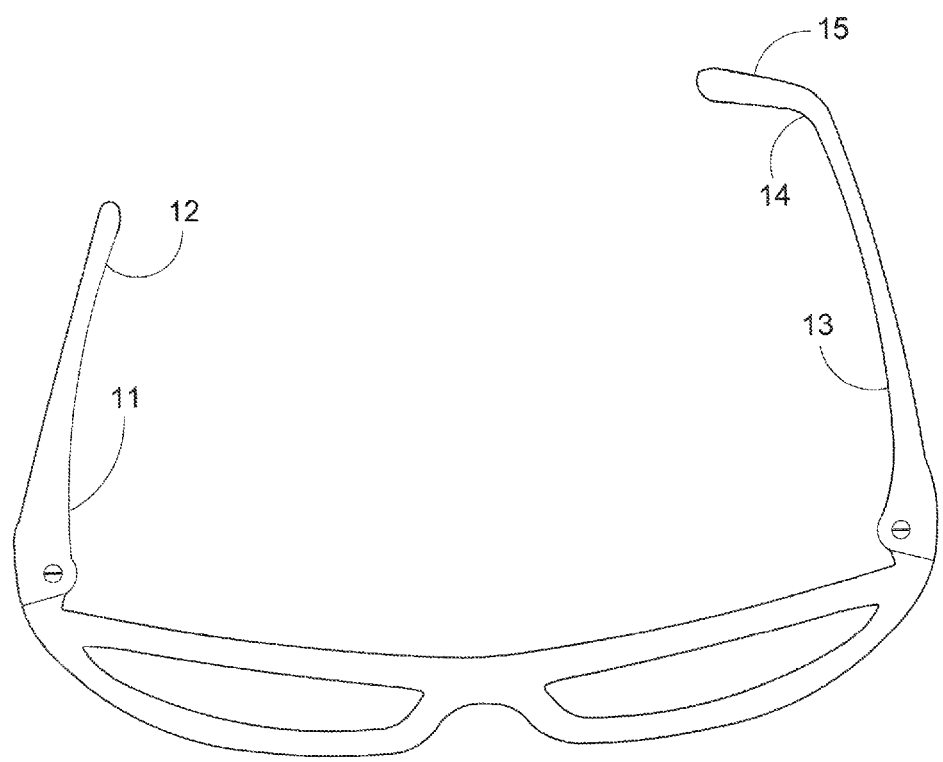
FIG. 3 depicts plastic flat arms Ear Free Eyewear Frame to accommodate a device worn in or on the right ear.

FIG. 3 depicts a plastic eyeglass frame, again emphasizing the comparison between the Ear Free Eyewear concept and the standard plastic eyeglass frame. In FIG. 3 there is shown a standard-length left plastic temple 13 of 5-to-6 inches (12.7-15-2 cm), on the left side of the illustrated eyeglass pair. Also on the left side is the standard plastic bend 14, and a standard left plastic earpiece 15. There is further observed, in FIG. 3, on the right side of the eyeglass pair, a shortened right plastic temple 11 and a horizontally-oriented right temple tip 12. This arrangement of eyeglass framing enables the wearer to enjoy the comfort of non-interference with an OTE or BTE which may be in use on the right side of the wearer's face.

Figure 4:
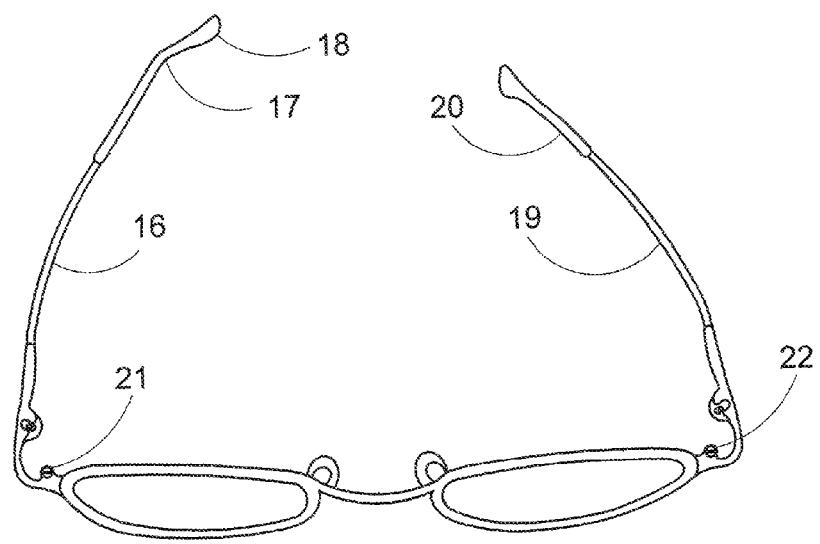
FIG. 4 illustrates a metal flat arms Ear Free Eyewear Frame for the wearer's left ear.

FIG. 4 depicts a metal eyeglass frame, showing the differences between the Ear Free Eyewear concept and a standard metal eyeglass frame. In FIG. 4 there is shown a standard-length right metal temple 16 of 5-to-6 inches (12.7-15-2 cm), on the right side of the illustrated eyeglass pair. Also on the right side is the standard metal bend 17, and a standard right metal earpiece 18. There is further observed, in FIG. 4, on the left side of the eyeglass pair, a shortened left metal temple 19 and a horizontal left temple tip 20. This special type of eyeglass framing enables the wearer to enjoy the comfort of non-interference with an OTE or BTE which may be in use on the left side of the wearer's face.

Figure 5:
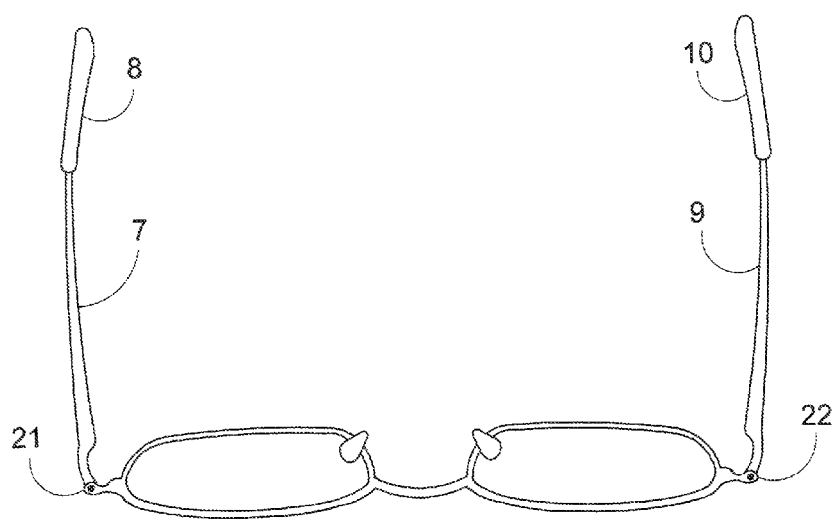
FIG. 5 figure presents the Ear Free Eyewear Frame, temple length, 4-5 inches (10.16-12.7 cm) on both temples to accommodate devices worn or in both ears.

In viewing FIG. 5, there is shown a depiction of an eyeglass frame that is totally "ear-free." There is further observed, in FIG. 5, on the left side of the eyeglass pair, a shortened left temple 7, said shortened left temple 7 having a linear extension, culminating with a horizontally-oriented left temple tip 8. On the right side of the eyeglass pair, there is seen a shortened right temple 9, said shortened right temple 9 having a linear extension, culminating with a horizontally-oriented right temple tip 10. Hinges 21 and 22 may be used to tighten the fit of either shortened temple tip 8, 10, against the wearer's face, as necessary.

Figure 6:
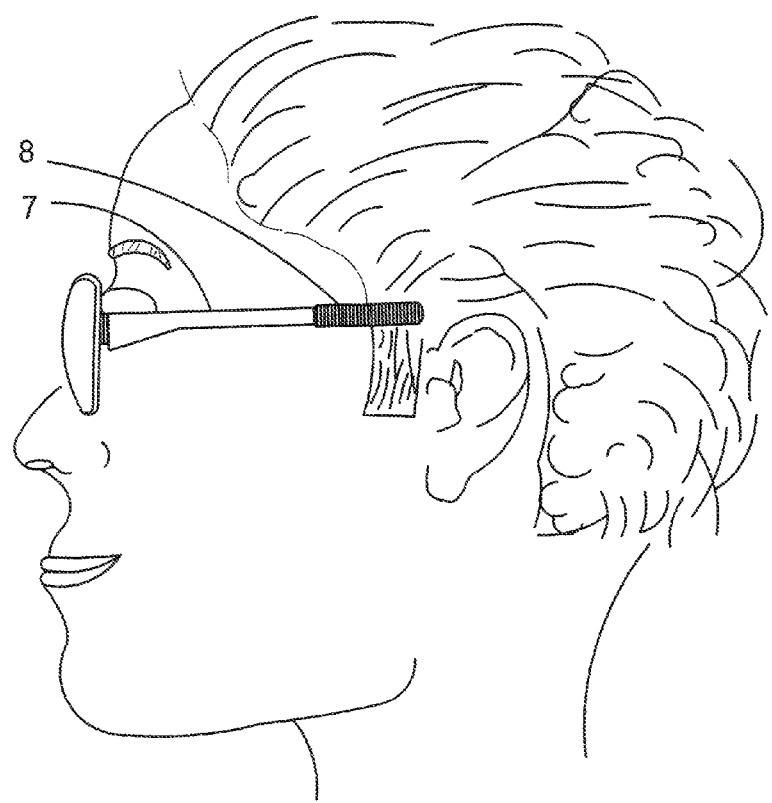
FIG. 6 demonstrates the area of facial contact experienced by a wearer of glasses, having a shortened temple on the left side of the wearer's face.

FIG. 6 presents the left side of the face of a wearer having a pair of eyeglasses wherein at least the left side of the eyeglass frame comprises a shortened left temple 7 and a left temple tip 8. Thus, it can be seen that a substantial amount of clearance is allowed for OTE or BTE devices on the left side of the wearer's face.

While preferred embodiments of the present inventive concept have been shown and disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, and by no means limited by the scope of the claims presented herein.

What is claimed is:

1. An eyeglass frame for a wearer's face, with a combination of frame members comprising:
    (a) a bridge having two opposite ends;
    (b) a left lens frame connected to one end of said bridge, and a right lens frame connected to the opposite end of said bridge;
    (c) a hinge connector affixed to the free end of each of said lens frames;
    (d) a first temple, of a length in the range of 5.0 inches to 6.0 inches, connected to one said hinge connector, said temple further including a bend extending downward from said temple and said bend culminating with an earpiece extending from said bend; and
    (e) a second temple, of a length in range of 3.0 inches to 4.5 inches, connected to the opposite hinge connector, said temple extending linearly and culminating in a temple tip, said temple tip inclusive in said range length.

2. The eyeglass frame as in claim 1, further comprising eyeglass frame members fabricated from metal, plastic, or composite material.

3. An eyeglass frame for a wearer's face, with a combination of frame members comprising:
    (a) a bridge having two opposite ends;
    (b) a pair of lenses, each lens having a right side and a left side;
    (c) a means for attaching one end of said bridge to the right side of one of said lenses and a means for attaching the opposite end of said bridge to the left side of the remaining lens;
    (d) a hinge connector affixed to the side of each of said lenses which side is not priorly attached to either end of said bridge;
    (e) a first temple, of a length in range of 5.0 inches to 6.0 inches, connected to one said hinge connector, said temple further including a bend extending downward from said temple and said bend culminating with an earpiece extending from said bend; and
    (f) a second temple, of a length in the range of 3.0 inches to 4.5 inches, connected to the opposite hinge connector, said temple extending linearly and culminating in a temple tip, said temple tip inclusive in said length range.

4. The eyeglass frame as in claim 3, further comprising eyeglass frame members fabricated from metal, plastic, or composite material.

* * * * *